United States Patent
Ru et al.

(10) Patent No.: US 11,358,056 B2
(45) Date of Patent: Jun. 14, 2022

(54) METHOD, DEVICE, AND STORAGE MEDIUM FOR CONTROLLING OBJECT

(71) Applicant: TENCENT TECHNOLOGY (SHENZHEN) COMPANY LIMITED, Shenzhen (CN)

(72) Inventors: Zhenchao Ru, Shenzhen (CN); Ying Sha, Shenzhen (CN); Jing Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/016,531

(22) Filed: Sep. 10, 2020

(65) Prior Publication Data

US 2020/0406134 A1 Dec. 31, 2020

Related U.S. Application Data

(63) Continuation of application No. PCT/CN2019/099410, filed on Aug. 6, 2019.

(30) Foreign Application Priority Data

Sep. 14, 2018 (CN) .......................... 201811076683.3

(51) Int. Cl.
A63F 13/42 (2014.01)
A63F 13/218 (2014.01)
(Continued)

(52) U.S. Cl.
CPC ............ *A63F 13/42* (2014.09); *A63F 13/218* (2014.09); *A63F 13/65* (2014.09); *A63F 13/92* (2014.09);
(Continued)

(58) Field of Classification Search
CPC ........ A63F 13/42; A63F 13/218; A63F 13/92; A63F 2300/1056
See application file for complete search history.

(56) References Cited

U.S. PATENT DOCUMENTS 9,687,741 B1 6/2017 Kim et al.
2010/0134428 A1* 6/2010 Oh ........................ G06F 3/0338
345/173
(Continued)

FOREIGN PATENT DOCUMENTS

| CN | 105641927 A | 6/2016 |
| CN | 105912162 A | 8/2016 |

(Continued)

OTHER PUBLICATIONS

International Search Report with English translation and Written Opinion regarding PCT/CN2019/099410 dated Nov. 4, 2019, 10 pages.
(Continued)

*Primary Examiner* — Jay Trent Liddle
(74) *Attorney, Agent, or Firm* — Crowell & Moring LLP

(57) ABSTRACT

The present disclosure describes a method, device, and storage medium for controlling a virtual object. The method includes obtaining, by a device, a first virtual feature and a second virtual feature, a virtual object in a virtual scene comprising the first virtual feature and the second virtual feature. The device includes a memory storing instructions and a processor in communication with the memory. The method further includes obtaining, by the device, a first physical force matching the first virtual feature and a second physical force matching the second virtual feature; and controlling, by the device according to the first physical force, the first virtual feature to perform a first action, and
(Continued)

controlling, according to the second physical force, the second virtual feature to perform a second action.

14 Claims, 6 Drawing Sheets

(51) Int. Cl.
*A63F 13/92* (2014.01)
*A63F 13/65* (2014.01)

(52) U.S. Cl.
CPC ............... *A63F 2300/1056* (2013.01); *A63F 2300/1068* (2013.01); *A63F 2300/8082* (2013.01)

(56) References Cited

U.S. PATENT DOCUMENTS

| | | | | |
|---|---|---|---|---|
| 2012/0169610 | A1* | 7/2012 | Berkes | G06F 3/04883 345/173 |
| 2018/0373376 | A1* | 12/2018 | Kurabayashi | A63F 13/533 |
| 2019/0291000 | A1* | 9/2019 | Campbell | A63F 13/214 |
| 2019/0336852 | A1* | 11/2019 | Gao | G06F 3/03547 |
| 2020/0261802 | A1* | 8/2020 | Zhuang | A63F 13/92 |
| 2020/0384350 | A1* | 12/2020 | Okamura | A63F 13/2145 |
| 2020/0384352 | A1* | 12/2020 | Okamura | A63F 13/426 |
| 2021/0268370 | A1* | 9/2021 | Doucet | A63F 13/24 |

FOREIGN PATENT DOCUMENTS

| | | |
|---|---|---|
| CN | 106155553 A | 11/2016 |
| CN | 106310657 A | 1/2017 |
| CN | 106648390 A | 5/2017 |
| CN | 107506122 A | 12/2017 |
| CN | 108319361 A | 7/2018 |
| CN | 109395373 A | 3/2019 |

OTHER PUBLICATIONS

Second Chinese Office Action with concise English translation regarding 2018-11076683.3 dated Jul. 14, 2021, 7 pages.
Chinese Office Action with Concise English Translation regarding 201811076683.3 dated Feb. 1, 2021, 10 pages.

* cited by examiner

METHOD, DEVICE, AND STORAGE MEDIUM FOR CONTROLLING OBJECT

RELATED APPLICATION

This application is a continuation application of PCT Patent Application No. PCT/CN2019/099410, filed on Aug. 6, 2019, which claims priority to Chinese Patent Application No. 201811076683.3, filed with the China National Intellectual Property Administration on Sep. 14, 2018, both of which are incorporated herein by reference in their entireties.

FIELD OF THE TECHNOLOGY

This application relates to the computer field, and in particular, to object control.

BACKGROUND OF THE DISCLOSURE

In many human-computer interaction applications, a virtual object in a virtual scene is usually controlled through a joystick set in a client.

SUMMARY

Embodiments of this application provide an object control method and device, a storage medium and an electronic device, thereby at least solving the technical problem of low control flexibility in object control methods provided in the related art.

According to an aspect of the embodiments of this application, an object control method is provided, including: obtaining a first virtual feature and a second virtual feature included at least by a virtual object in a virtual scene; obtaining a first physical force matching the first virtual feature and a second physical force matching the second virtual feature; and controlling, according to the first physical force, the first virtual feature to perform a first action, and controlling, according to the second physical force, the second virtual feature to perform a second action.

According to another aspect of the embodiments of this application, an object control device is further provided, including: a first obtaining unit, configured to obtain a first virtual feature and a second virtual feature included at least by a virtual object in a virtual scene; a second obtaining unit, configured to obtain a first physical force matching the first virtual feature and a second physical force matching the second virtual feature; and an execution unit, configured to control, according to the first physical force, the first virtual feature to perform a first action, and control, according to the second physical force, the second virtual feature to perform a second action.

According to still another aspect of the embodiments of this application, a storage medium is further provided. The storage medium stores a computer program and the computer program is configured to perform, when running, the foregoing object control method.

According to yet another aspect of the embodiments of this application, an electronic device is further provided, including a memory, a processor and a computer program stored in the memory and executable on the processor. The processor performs the foregoing object control method through the computer program.

The present disclosure describes an embodiment for a device for controlling a virtual object. The device includes a memory storing instruction; and a processor in communication with the memory. When the processor executes the instructions, the processor is configured to cause the device to: obtain a first virtual feature and a second virtual feature, a virtual object in a virtual scene comprising the first virtual feature and the second virtual feature; obtain a first physical force matching the first virtual feature and a second physical force matching the second virtual feature; and control, according to the first physical force, the first virtual feature to perform a first action, and control, according to the second physical force, the second virtual feature to perform a second action.

The present disclosure describes an embodiment for a non-transitory computer readable storage medium storing computer readable instructions. The computer readable instructions, when executed by a processor, are configured to cause the processor to perform: obtaining a first virtual feature and a second virtual feature, a virtual object in a virtual scene comprising the first virtual feature and the second virtual feature; obtaining a first physical force matching the first virtual feature and a second physical force matching the second virtual feature; and controlling, according to the first physical force, the first virtual feature to perform a first action, and controlling, according to the second physical force, the second virtual feature to perform a second action.

In the embodiments of this application, a method is provided, including: obtaining a first virtual feature and a second virtual feature included at least by a virtual object in a virtual scene; obtaining a first physical force matching the first virtual feature and a second physical force matching the second virtual feature; and controlling, according to the first physical force, the first virtual feature to perform a first action, and controlling, according to the second physical force, the second virtual feature to perform a second action. In the foregoing method, after obtaining the first virtual feature and the second virtual feature of the virtual object, the first virtual feature is controlled through the obtained first physical force and the second virtual feature is controlled through the obtained second physical force, thereby flexibly controlling the first virtual feature and the second virtual feature of the virtual object, and solving the technical problem of low control flexibility in object control methods provided in the related art.

BRIEF DESCRIPTION OF THE DRAWINGS

The accompanying drawings described herein are used for providing further understanding for this application, and constitute a part of this application. Exemplary embodiments of this application and descriptions thereof are used for explaining this application and do not constitute an improper limitation to this application. In the drawings.

DESCRIPTION OF EMBODIMENTS

To make a person skilled in the art better understand solutions of this application, the following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms such as "first" and "second" in the specification, the claims and the accompanying drawings of this application are intended to distinguish between similar objects, but are not necessarily used for describing a specific sequence or a precedence level. It is to be understood that the data termed in such a way are interchangeable in proper circumstances, so that the embodiments of this application described herein can be implemented in orders except the order illustrated or described herein. In addition, the terms "include", "comprise" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
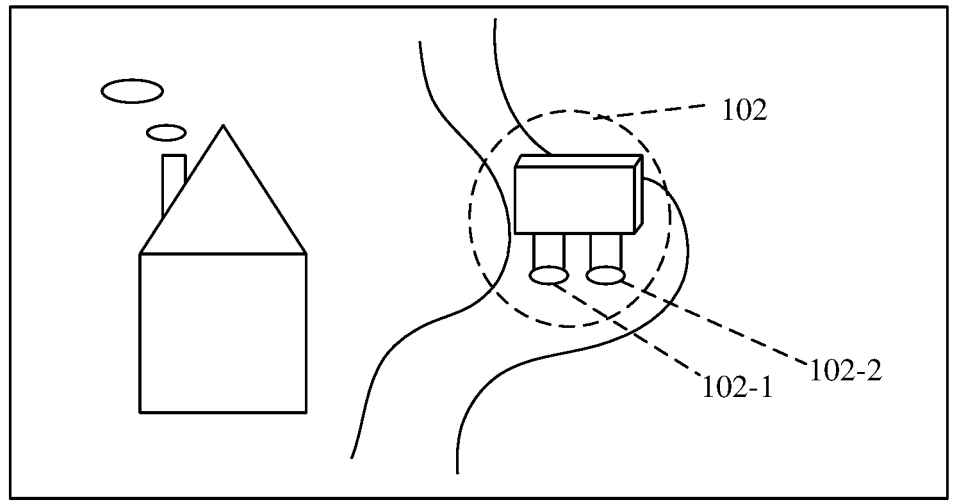
FIG. 1 is a schematic diagram of an application environment of an object control method according to an embodiment of this application.

According to an aspect of the embodiments of this application, an object control method is provided. In an optional implementation, the foregoing object control method may be, but is not limited to, applied to an application scenario as shown in FIG. 1.

A virtual object 102 in a virtual scene includes a first virtual feature 102-1 and a second virtual feature 102-2. A first physical force is obtained to control the first virtual feature 102-1 to perform a first action, and a second physical force is obtained to control the second virtual feature 102-2 to perform a second action.

In the related art, in human-computer interaction applications, when controlling a virtual object, a left hand usually controls directional movement and a right hand controls actions. However, the foregoing control method may only control the virtual object to perform a simple predetermined action according to a pre-configured action trajectory, resulting in low control flexibility when controlling the virtual object. In this embodiment, by obtaining the first virtual feature and the second virtual feature of the virtual object controlled by an application client, the first physical force may be used for controlling the first virtual feature, and the second physical force may be used for controlling the second virtual feature, thereby flexibly controlling a direction of the virtual object with left and right hands, and improving control efficiency of the virtual object.

Figure 2:
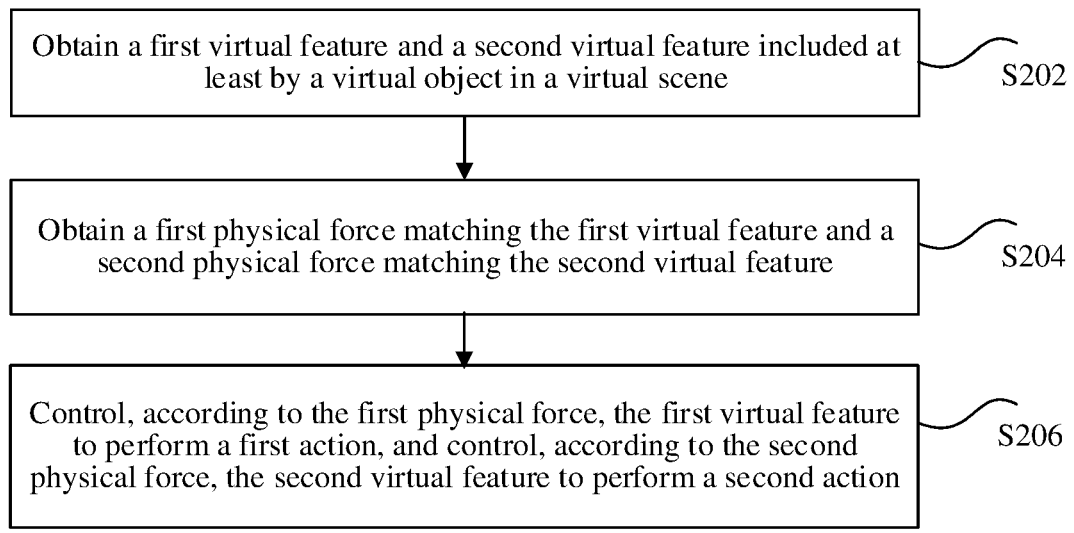
FIG. 2 is a schematic flowchart of an optional object control method according to an embodiment of this application.

Optionally, as an optional implementation, as shown in FIG. 2, the foregoing object control method includes:

S202. Obtain a first virtual feature and a second virtual feature included at least by a virtual object in a virtual scene. The virtual object in the virtual scene includes the first virtual feature and the second virtual feature.

The virtual object may be controlled through an application client, or through other methods, applications, programs, and the like.

S204. Obtain a first physical force matching the first virtual feature and a second physical force matching the second virtual feature.

S206. Control, according to the first physical force, the first virtual feature to perform a first action, and control, according to the second physical force, the second virtual feature to perform a second action.

Optionally, the foregoing object control method may be, but is not limited to, applied to a terminal that may calculate data, such as a mobile phone, a tablet computer, and a laptop; or may be, but is not limited to, applied to an entertainment device that may perform human-computer interaction, such as a game console, a PS3, a PS4 and other gaming devices.

For example, if the above object control method is applied to a game console, the game console runs a game program, the game program includes the above virtual object, and the above virtual object includes a first virtual feature and a second virtual feature, the first physical force received by the game console may be used to control the first virtual feature, and the second physical force received by the game console may be used to control the second virtual feature, thereby flexibly controlling the virtual object in the game console.

Optionally, the above object control method may be, but is not limited to, applied to game applications. For example, a game application runs on the terminal, and the game application includes a virtual object. A first physical force obtained by the terminal is used to control a first virtual feature of the virtual object in the game application to perform a first action, and a second physical force obtained by the terminal is used to control a second virtual feature of the virtual object in the game application to perform a second action, thereby improving control efficiency of the virtual object in the game application.

Optionally, the first physical force and the second physical force may be obtained through a terminal, or the first physical force and the second physical force may be obtained through different terminals. For example, when obtaining the first physical force and the second physical force, the first physical force and the second physical force applied by a first account that logs on to an application client through a first terminal are obtained; or the first physical force applied by a first account that logs on to an application client through a first terminal, and the second physical force applied by a second account that logs on to an application client through a second terminal are obtained.

For example, taking the above obtaining the first physical force applied by the first account that logs on to the application client through the first terminal, and the second physical force applied by the second account that logs on to the application client through the second terminal as an example, the first terminal and the second terminal run the game program synchronously. The game program includes a virtual object. The first terminal obtains the first physical force to control the first virtual feature of the virtual object to perform the first action, and the second terminal obtains the second physical force to control the second virtual feature of the virtual object to perform the second action.

The first virtual feature and the second virtual feature may be composition structures of the virtual object that are capable of performing actions independently. Correspondingly, the virtual object may include at least two virtual features. In the embodiments of this application, the first virtual feature and the second virtual feature are any two of the virtual features included in the virtual object.

Optionally, the first virtual feature and the second virtual feature may be, but are not limited to, different feet, different tires or different wings of the virtual object. The first action and the second action may be, but are not limited to, moving actions.

For example, taking the first virtual feature and the second virtual feature being different feet, and the first action and the second action being moving actions as an example, description will be made with reference to a process of running a game application on a terminal. The game application running on the terminal includes a virtual object. The virtual object includes a plurality of feet. The terminal controls, according to the obtained first physical force, one foot of the virtual object to move, and controls, according to the obtained second physical force, another foot of the virtual object to move.

Optionally, the obtaining a first physical force matching the first virtual feature and a second physical force matching the second virtual feature may be, but are not limited to, obtaining, by the application client, the first physical force and the second physical force applied to the terminal on which the application client runs, or obtaining, by the application client, the first physical force and the second physical force applied to a hardware device connected to the terminal on which the application client runs.

Figure 3:
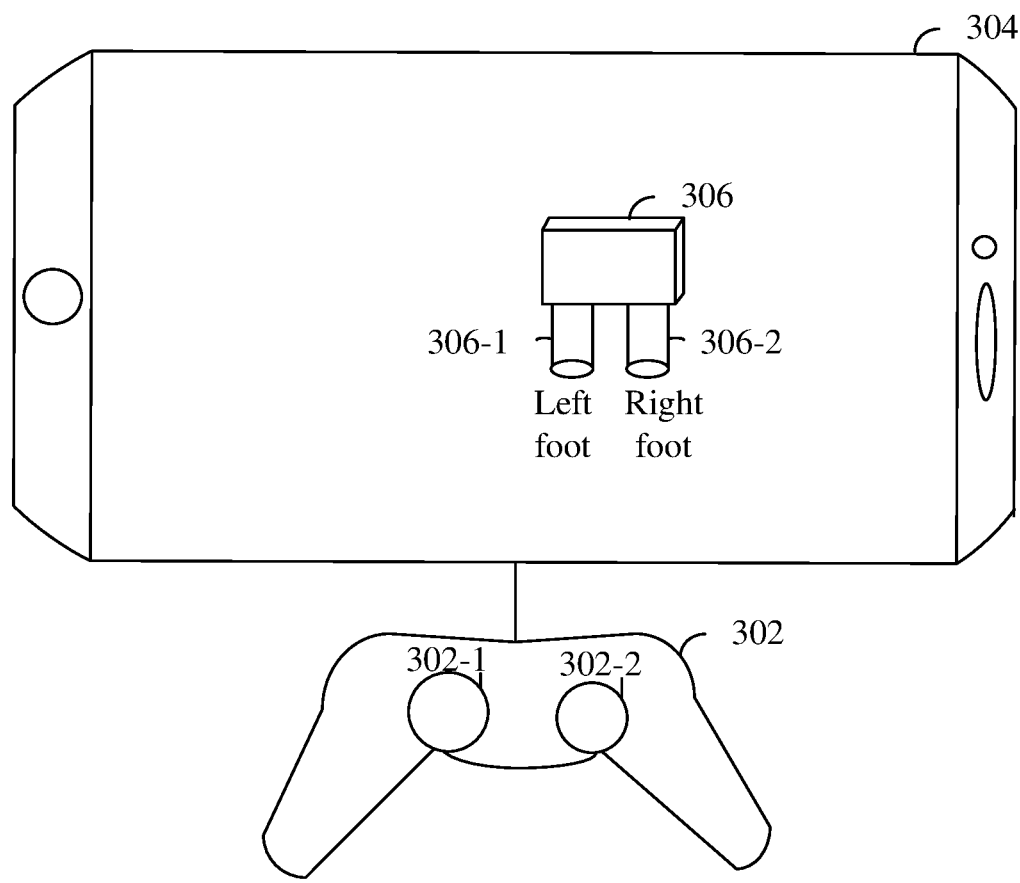
FIG. 3 is a schematic diagram of an optional object control method according to an embodiment of this application.

For example, description is made in a case that the application client obtains the first physical force and the second physical force applied to the hardware device connected to the terminal on which the application client runs, and the first physical force and the second physical force control movement of different feet of the virtual object. As shown in FIG. 3, FIG. 3 includes a hardware device 302, and the hardware device includes a module 302-1, configured to receive the first physical force, and a module 302-2, configured to receive the second physical force. After obtaining the first physical force and the second physical force, the first physical force and the second physical force are transmitted to a terminal 304, and a game application running on the terminal 304 includes a virtual object 306. The terminal uses the first physical force to control a left foot 306-1 of the virtual object 306 to move, and uses the second physical force to control a right foot 306-2 of the virtual object 306 to move.

The terminal 304 and the hardware device 302 may be, but are not limited to, connected using a hardware line or a wireless network.

Optionally, after obtaining the first physical force and the second physical force, a force function matching the virtual scene where the virtual object is located may be determined; a first control force matching the first physical force is determined according to the first physical force and the force function, and the first control force is used to control the first virtual feature to perform a first action; a second control force matching the second physical force is determined according to the second physical force and the force function, and the second control force is used to control the second virtual feature to perform a second action. However, this application is not limited thereto.

Optionally, the above first control force may control, but is not limited to, amplitude of the first virtual feature performing the first action, and the above second control force may control, but is not limited to, amplitude of the second virtual feature performing the second action.

Figure 4:
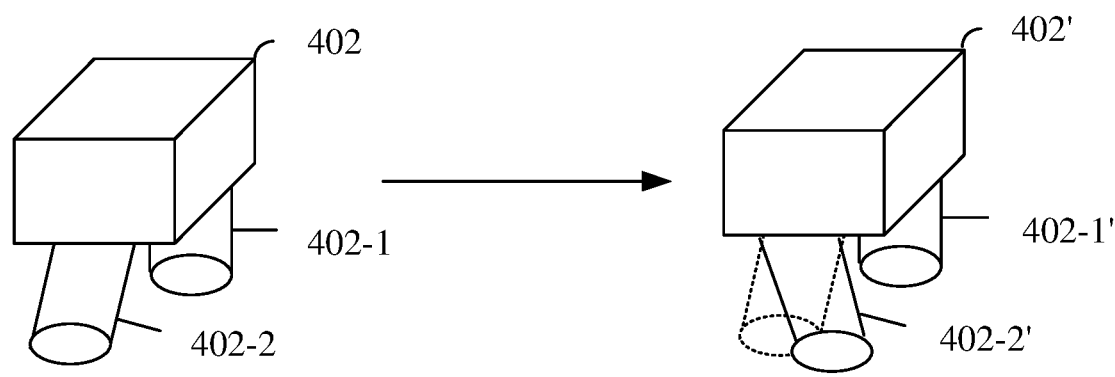
FIG. 4 is a schematic diagram of another optional object control method according to an embodiment of this application.

For example, taking the obtaining the first physical force and the second physical force to control movement of two feet of the virtual object as an example, as shown in FIG. 4, FIG. 4 includes a virtual object 402, and the virtual object 402 includes a left foot 402-1 and a right foot 402-2. After obtaining the second physical force, a second control force is determined according to the second physical force and the force function, and the second control force is used to control the right foot 402-2 of the virtual object 402 to move. The greater the second control force is, the greater the movement amplitude of the right foot 402-2 of the virtual object 402 is. The left foot 402-1' of the moved virtual object 402' has not moved while the right foot 402-2' has moved according to control of the second control force.

The following illustration takes the virtual object being a virtual object on a game console, and the first physical force and the second physical force controlling movement of a left foot and a right foot of the virtual object as an example. The game console obtains the first physical force and the second physical force through an external game pad. After obtaining the first physical force and the second physical force, a first control force is determined according to the first physical force and the force function, and a second control force is determined according to the second physical force and the force function. The first control force is used to control the left foot of the virtual object to move, and the second control force is used to control the right foot of the virtual object to move, thereby controlling the left foot and the right foot of the virtual object to move, and flexibly controlling the virtual object.

In this embodiment, by obtaining the first virtual feature and the second virtual feature of the virtual object controlled by an application client, the first physical force may be used for controlling the first virtual feature, and the second physical force may be used for controlling the second virtual feature, thereby flexibly controlling a direction of the virtual object with left and right hands, and improving control efficiency of the virtual object.

In an optional implementation, the controlling, according to the first physical force, the first virtual feature to perform a first action, and controlling, according to the second physical force, the second virtual feature to perform a second action includes:

S1. Determine a force function matching the virtual scene where the virtual object is located;

S2. Determine, according to the first physical force and the force function, a first control force matching the first physical force, and use the first control force to control the first virtual feature to perform the first action.

S3. Determine, according to the second physical force and the force function, a second control force matching the second physical force, and use the second control force to control the second virtual feature to perform the second action.

Optionally, after obtaining the first physical force, the first physical force is inputted as an independent variable into the force function, and the force function outputs the first control force; and the second physical force is inputted into the force function, and the force function outputs the second control force. However, this application is not limited thereto.

For example, taking a game application running on a game console as an example, there is a virtual object in the game application, and the game console controls, by obtaining the first physical force and the second physical force applied to the game console, a left wing and a right wing of the virtual object to fly. After the game console obtains the first physical force and the second physical force, the first physical force and the second physical force are inputted into the force function to obtain the first control force and the second control force. The game console uses the first control force to control the left wing of the virtual object to fly, and uses the second control force to control the right wing of the virtual object to fly.

The above force function may be changed according to a change of the virtual scene.

In this embodiment, the force function matching the virtual scene of the virtual object is determined, the first control force is determined according to the first physical force and the force function, and the second control force is determined according to the second physical force and the force function. Therefore, different force functions may be selected for virtual scenes of different virtual objects, and then the first control force and the second control force matching the virtual scene are determined, thereby improving accuracy of the first control force and the second control force and flexibility and efficiency of controlling the virtual object.

In an optional implementation,

S1. The determining, according to the first physical force and the force function, a first control force matching the first physical force includes: obtaining, according to the force function, a first force coefficient matching the first physical force, and a first maximum control force used in a case that a first action is performed in a virtual scene; and determining the first control force according to the first force coefficient, the first maximum control force and a first force vector matching the first physical force.

S2. The determining, according to the second physical force and the force function, a second control force matching the second physical force includes: obtaining, according to the force function, a second force coefficient matching the second physical force, and a second maximum control force used in a case that a second action is performed in a virtual scene; and determining the second control force according to the second force coefficient, the second maximum control force and a second force vector matching the second physical force.

Optionally, the first maximum control force may be, but is not limited to, a maximum control force acceptable to a first feature object, and the second maximum control force may be, but is not limited to, a maximum control force acceptable to a second feature object. When the obtained first physical force exceeds the first maximum control force, a value of the first maximum control force is assigned to the first physical force. When the obtained second physical force exceeds the second maximum control force, a value of the second maximum control force is assigned to the second physical force.

Optionally, the first control force may be obtained by the following formula:

the first control force=the first force coefficient*the first maximum control force*the first force vector and the second control force may be obtained by the following formula:

the second control force=the second force coefficient*the second maximum control force*the second force vector For example, a game application runs on a game console, the game application includes a virtual object, and the game console controls, by receiving the first physical force and the second physical force, a left tire and a right tire of the virtual object to rotate. The game console determines the force function and determines the first force coefficient and the second force coefficient according to a type of the game application, determines the first maximum control force and the second maximum control force according to a type of the virtual object in the game application, determines a first force vector according to the first physical force, and determines a second force vector according to the second physical force. Then, the first control force and the second control force are obtained according to the formulas. Then, the left tire of the virtual object is controlled according to the first control force to rotate, and the right tire of the virtual object is controlled according to the second control force to rotate.

In this embodiment, by obtaining the first control force and the second control force according to the above formulas, accuracy of the first control force and the second control force is improved, thereby improving control efficiency of the virtual object.

In an optional implementation,

S1. The obtaining, according to a force function, a first force coefficient matching a first physical force includes: obtaining the first force coefficient according to a first action duration for which a first control component sustains the first physical force and the force function.

S2. The obtaining, according to a force function, a second force coefficient matching a second physical force includes: obtaining the second force coefficient according to a second action duration for which a second control component sustains the second physical force and the force function.

Optionally, the first force coefficient may be, but is not limited to, a positive or negative number or may be changed in real time. That is to say, the force function may be, but is not limited to, an increasing function or a decreasing function, or a function that increases in a certain interval and decreases in another interval.

Figure 5:
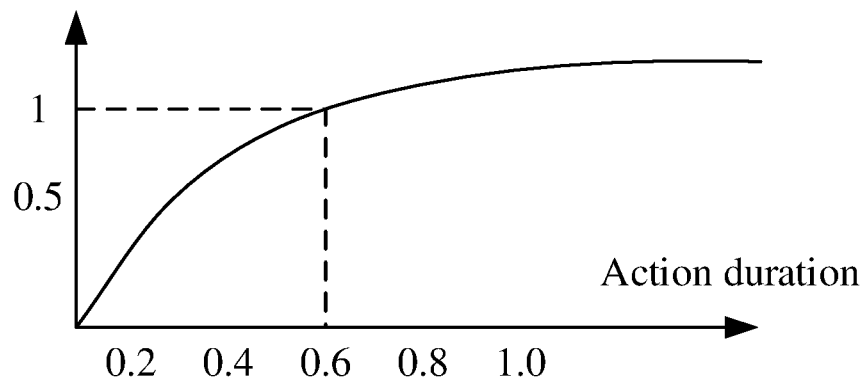
FIG. 5 is a schematic diagram of still another optional object control method according to an embodiment of this application.

For example, taking the first force coefficient being a positive number and the force function being an increasing function as an example, as shown in FIG. 5, FIG. 5 is an optional relationship between a physical force and an action duration, the action duration including but not limited to a first action duration and a second action duration. After obtaining the first action duration and the second action duration, the first action duration and the second action duration are inputted into the force function, and the first force coefficient and the second force coefficient are determined according to a slope of the force function, so as to obtain the first control force and the second control force according to the obtained first force coefficient and second force coefficient, and the first control force and the second control force are used to control a virtual object to perform a first action and a second action.

In the embodiments of this application, a control component may be a physical component or a virtual component. When the control component is the physical component, the control component may specifically include a joystick, a button, a touch key and the like; and when the control component is the virtual component, the control component may specifically include a virtual joystick, a virtual button and the like. The first control component and the second control component may both be physical components, or may both be virtual components, or may be different types of components. For example, one is a physical component and the other is a virtual component.

In this embodiment, the first force coefficient is obtained according to the first action duration of the first physical force on the first control component, and the second force coefficient is obtained according to the second action duration of the second physical force on the second control component, so as to obtain the first control force and the second control force according to the first force coefficient and the second force coefficient, thereby improving flexibility of the first control force and the second control force, and control efficiency of the virtual object.

In an optional implementation, the obtaining a first physical force matching a first virtual feature and a second physical force matching a second virtual feature includes:

obtaining the first physical force sustained by a first control component for controlling the first virtual feature and the second physical force sustained by a second control component for controlling the second virtual feature.

The first control component includes a first virtual joystick provided on a display interface of a terminal, or a first operating joystick provided in a peripheral input device.

The second control component includes a second virtual joystick provided on the display interface of the terminal, or a second operating joystick provided in the peripheral input device.

Figure 6:
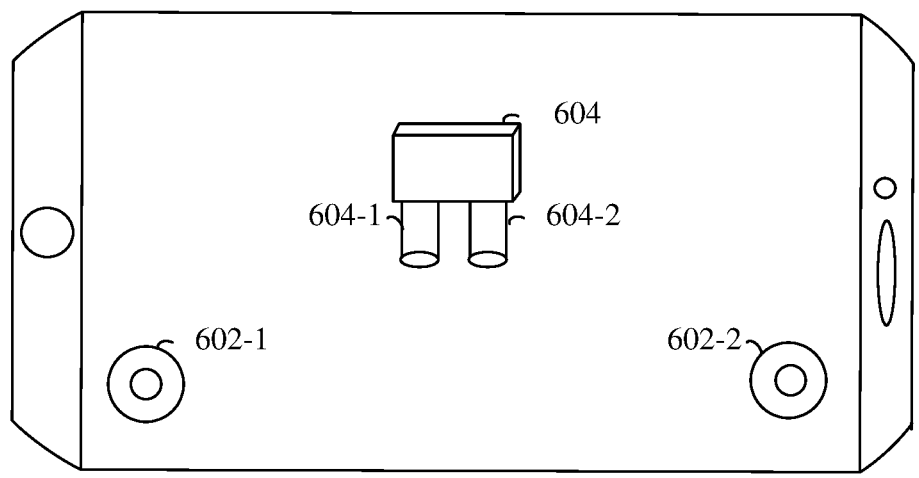
FIG. 6 is a schematic diagram of yet another optional object control method according to an embodiment of this application.

For example, when the first control component and the second control component are respectively the first virtual joystick and the second virtual joystick, the first virtual joystick and the second virtual joystick may be, but are not limited to, located on a display screen of the terminal. For example, taking the terminal receiving the first physical force and the second physical force to control a left foot and a right foot of the virtual object to move as an example, as shown in FIG. 6, the terminal displays a first virtual joystick 602-1 and a second virtual joystick 602-2. The first virtual joystick 602-1 is configured to receive the first physical force, and the second virtual joystick 602-2 is configured to receive the second physical force. After obtaining the first physical force and the second physical force, the first control force and the second control force are obtained through the above process, so as to use the first control force to control a left foot 604-1 of the virtual object 604 to move, and use the second control force to control a right foot 604-2 of the virtual object 604 to move.

In this embodiment, the first physical force and the second physical force are obtained by providing the first virtual joystick and the second virtual joystick on the interface of the terminal where the application client is located, or the first physical force and the second physical force are obtained according to the peripheral input device, so as to improve efficiency of obtaining the first physical force and the second physical force, thereby improving control efficiency of controlling the virtual object.

In an optional implementation, before the determining the first control force according to the first force coefficient, the first maximum control force and a first force vector matching the first physical force, the method further includes:

scaling, according to a first scale, a force magnitude of the first physical force to obtain a vector size of the first force vector; and determining a vector direction of the first force vector according to a force direction of the first physical force; and before the determining the second control force according to the second force coefficient, the second maximum control force and a second force vector matching the second physical force, the method further includes:

scaling, according to a second scale, a force magnitude of the second physical force to obtain a vector size of the second force vector; and determining a vector direction of the second force vector according to a force direction of the second physical force.

Optionally, taking a terminal receiving the first physical force and the second physical force to control a left foot and a right foot of the virtual object to move as an example, the terminal may obtain, when obtaining the first physical force and the second physical force, not only sizes of the first physical force and the second physical force, but also directions of the first physical force and the second physical force. Directions of the first force vector and the second force vector are determined according to the directions of the first physical force and the second physical force, so as to obtain directions of the first control force and the second control force. Therefore, when using the first control force to control the first virtual feature to perform the first action, a direction of the first action may be controlled by the direction of the first control force. When using the second control force to control the second virtual feature to perform the second action, a direction of the second action may be controlled by the direction of the second control force.

In this embodiment, the first force vector and the second force vector are obtained according to the above method, so as to determine the directions of the first control force and the second control force, thereby improving control efficiency of controlling the virtual object.

In an optional implementation,

S1. The determining a vector direction of a first force vector according to a force direction of a first physical force includes: determining a viewing angle direction in a virtual scene; and using a coordinate transformation matrix matching the viewing angle direction and a first direction vector corresponding to the force direction of the first physical force to perform coordinate transformation to obtain a first target direction vector used for indicating the vector direction of the first force vector.

S2. The determining a vector direction of a second force vector according to a force direction of a second physical force includes: determining a viewing angle direction in a virtual scene; and using a coordinate transformation matrix matching the viewing angle direction and a second direction vector corresponding to the force direction of the second physical force to perform coordinate transformation to obtain a second target direction vector used for indicating the vector direction of the second force vector.

The viewing angle direction herein may be a current viewing angle direction in the virtual scene when the viewing angle direction is determined.

Figure 7:
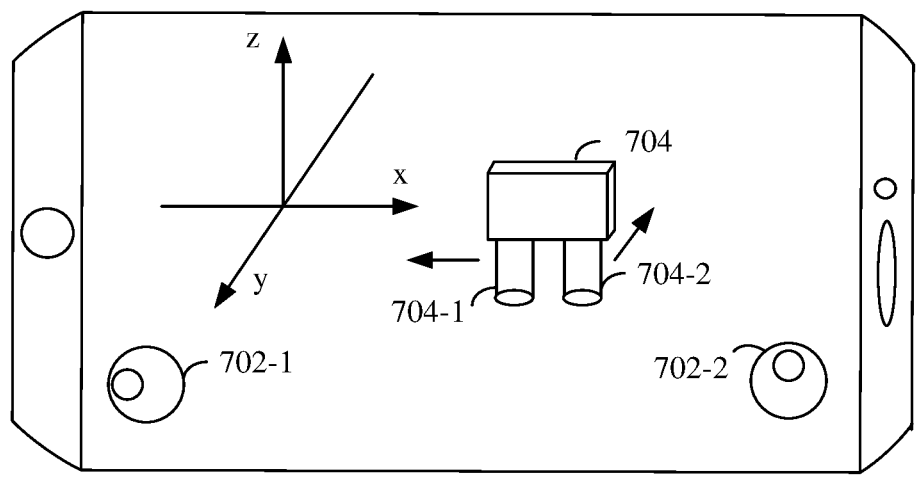
FIG. 7 is a schematic diagram of still yet another optional object control method according to an embodiment of this application.

Optionally, the coordinate transformation matrix may be, but is not limited to, a spatial rectangular coordinate system established in the virtual scene. A plane composed by x and y axes of the spatial rectangular coordinate system corresponds to a display screen of a terminal where the virtual scene is located. Taking the terminal receiving the first physical force and the second physical force to control a left foot and a right foot of the virtual object to move as an example, as shown in FIG. 7, a current viewing angle direction of a virtual environment in FIG. 7 is a negative direction of the y axis. A first virtual joystick 702-1 receives the first physical force that is left relative to the screen of the terminal, and a second virtual joystick 702-2 receives the second physical force that is upward relative to the screen of the terminal. After a client receives the first physical force, since a first direction vector of the first physical force is left, the first target direction vector in a virtual space corresponding to a negative direction of the x axis is obtained. The first control force is determined according to the first target direction vector, thereby controlling the left foot 704-1 of the virtual object 704 to move in the negative direction of the x axis, and it is determined, according to the second direction vector of the second physical force, that the second target direction vector is in the negative direction of the y axis. After the second control force is determined according to the second target direction vector, the right foot 704-2 of the virtual object 704 is controlled according to the second control force to move in the negative direction of the y axis.

In this embodiment, the first target direction vector and the second target direction vector are obtained and the first control force and the second control force are determined according to the first target direction vector and the second target direction vector, thereby controlling the virtual object and improving control efficiency of controlling the virtual object.

In an optional implementation, if a first virtual feature includes a first foot and a second virtual feature includes a second foot, the controlling, according to the first physical force, the first virtual feature to perform a first action, and controlling, according to the second physical force, the second virtual feature to perform a second action includes:

S1. Control the first foot of the virtual object to perform the first action.

S2. Control the second foot of the virtual object to perform the second action.

In this embodiment, the first foot of the virtual object is controlled to perform the first action and the second foot of the virtual object is controlled to perform the second action, thereby improving control efficiency of controlling the virtual object.

In an optional implementation, the obtaining a first physical force matching a first virtual feature and a second physical force matching a second virtual feature includes:

S1. Obtain a first state identifier matching the first virtual feature and a second state identifier matching the second virtual feature.

S2. Obtain, in a case that the first state identifier indicates that the first virtual feature is in an undamaged state, the first physical force, where it is determined, in a case that the first virtual feature is located in a security zone set in a virtual scene, that the first virtual feature is in the undamaged state.

S3. Obtain, in a case that the second state identifier indicates that the second virtual feature is in a state of being not completely damaged, the second physical force, where it is determined, in a case that the second virtual feature is located in a security zone set in a virtual scene, that the second virtual feature is in the undamaged state.

Optionally, the first state identifier and the second state identifier may be, but are not limited to, represented by characters, icons, colors or the like. For example, if the first state identifier and the second state identifier are red, it indicates that the first virtual feature or the second virtual feature is in a damaged state; and if the first state identifier and the second state identifier are green, it indicates that the first virtual feature or the second virtual feature is in an undamaged state. Alternatively, if one of the first virtual feature and the second virtual feature is in a damaged state and the other is in an undamaged state, one of the first state identifier and the second state identifier is red and the other is green.

In this embodiment, by obtaining the first state identifier and the second state identifier, the states of the first virtual feature and the second virtual feature may be accurately identified, thereby improving control efficiency of controlling the virtual object.

In an optional implementation, the obtaining a first physical force matching a first virtual feature and a second physical force matching a second virtual feature includes:

(1) obtaining the first physical force and the second physical force applied by a first account that logs on to an application client through a first terminal; or (2) obtaining the first physical force applied by the first account that logs on to the application client through the first terminal, and obtaining the second physical force applied by a second account that logs on to the application client through a second terminal.

In this embodiment, the first physical force and the second physical force are obtained through the first terminal; or the first terminal obtains the first physical force and the second terminal obtains the second physical force, thereby improving flexibility of obtaining the first physical force and the second physical force, and improving flexibility of controlling the virtual object on the basis of ensuring efficiency of controlling the virtual object.

The following uses an example that a first virtual joystick on a terminal obtains the first physical force, a second virtual joystick obtains the second physical force, the calculated first control force is used to control a left foot of the virtual object to move, and the second control force is used to control a right foot of the virtual object to move, which is explained with reference to FIG. 8.

Figure 8:
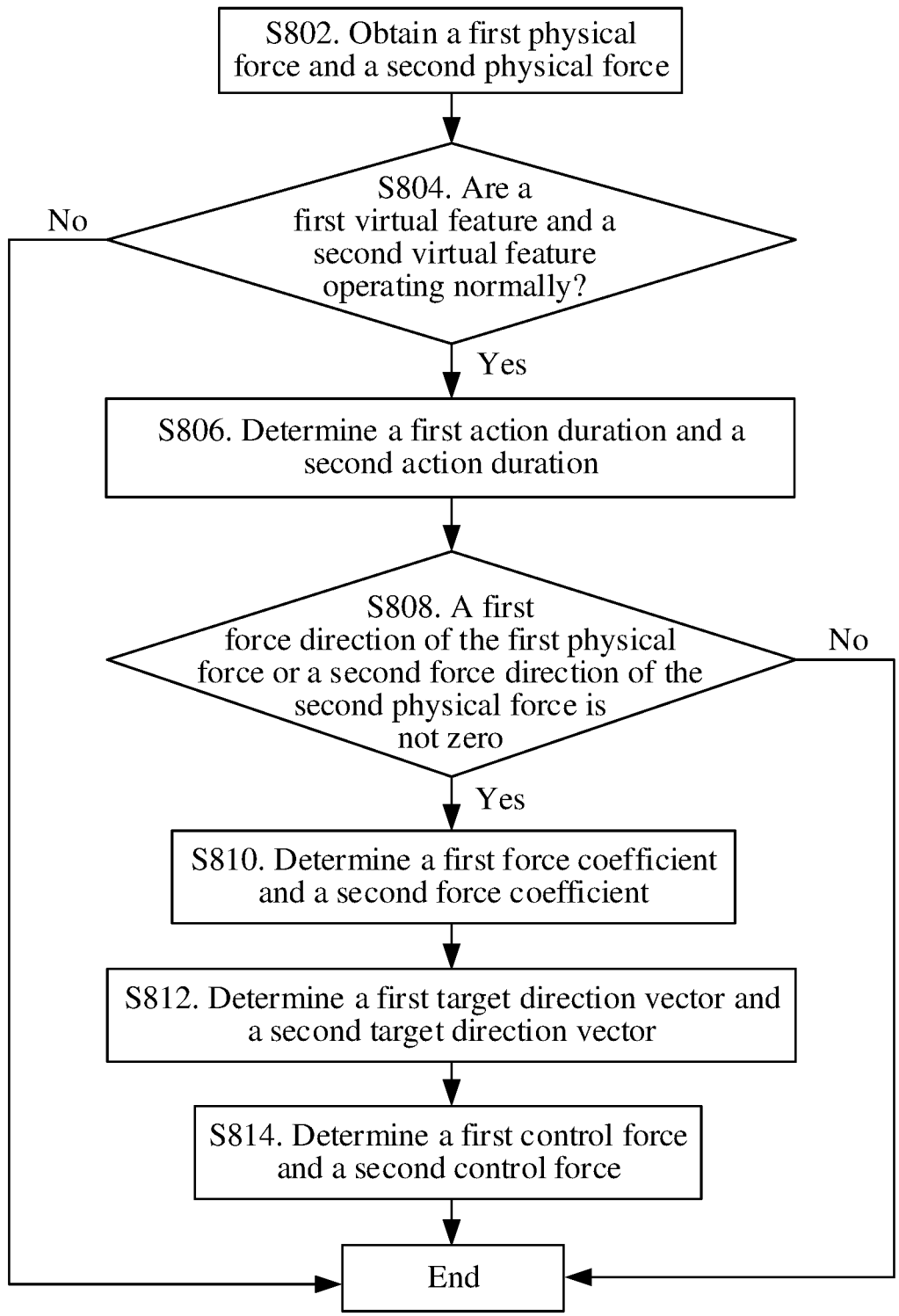
FIG. 8 is a schematic diagram of a further optional object control method according to an embodiment of this application.

As shown in FIG. 8, the terminal, by S802, uses the first virtual joystick on the terminal to obtain the first physical force, and uses the second virtual joystick to obtain the second physical force. After the first physical force and the second physical force are obtained, whether the first virtual feature and the second virtual feature are operating normally is determined by S804. If the first virtual feature and the second virtual feature are operating normally, a first action duration and a second action duration are obtained by S806. Then, S808 in FIG. 8 is performed to determine whether the first force direction of the first physical force and the second force direction of the second physical force are zero. If the directions are not zero, S810 is performed to determine a first force coefficient and a second force coefficient by inputting the first action duration and the second action duration into the force function shown in FIG. 5. In another implementation, S808 may include determining whether the first force magnitude of the first physical force and the second force magnitude of the second physical force are zero. If the magnitude are not zero, S810 is performed to determine a first force coefficient and a second force coefficient by inputting the first action duration and the second action duration into the force function.

Then, S812 is performed to obtain the first target direction vector and the second target direction vector by transforming the first force direction of the first physical force and the second force direction of the second physical force through the coordinate transformation matrix. Finally, the first control force and the second control force are calculated by operation S814. The first control force is used to control the left foot of the virtual object to move, and the second control force is used to control the right foot of the virtual object to move.

To make the description simple, the foregoing method embodiments are stated as a series of action combinations. However, a person skilled in the art needs to learn that this application is not limited to the described sequence of the actions because according to this application, some steps may use another sequence or may be simultaneously performed. Those skilled in the art are also to be aware that the embodiments described in the specification are all exemplary embodiments, and the actions and modules involved are not necessarily required by this application.

Figure 9:
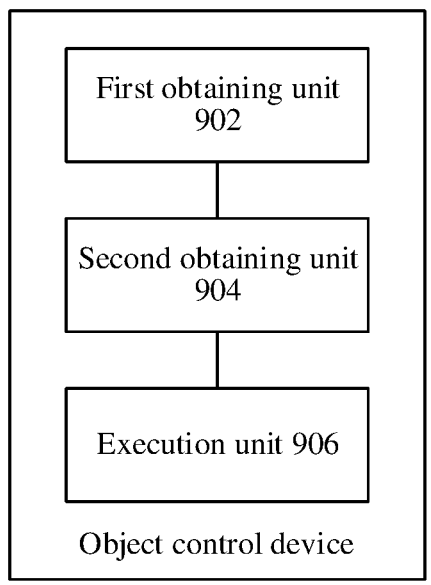
FIG. 9 is a schematic structural diagram of another optional object control device according to an embodiment of this application.

According to another aspect of the embodiments of this application, an object control device for implementing the above object control method is further provided. As shown in FIG. 9, the device includes:

a first obtaining unit 902, configured to obtain a first virtual feature and a second virtual feature included at least by a virtual object in a virtual scene;

a second obtaining unit 904, configured to obtain a first physical force matching the first virtual feature and a second physical force matching the second virtual feature; and an execution unit 906, configured to control, according to the first physical force, the first virtual feature to perform a first action, and control, according to the second physical force, the second virtual feature to perform a second action.

Optionally, the first physical force and the second physical force may be obtained through a terminal, or the first physical force and the second physical force may be obtained through different terminals. For example, when obtaining the first physical force and the second physical force, the first physical force and the second physical force applied by a first account that logs on to an application client through a first terminal are obtained; or the first physical force applied by a first account that logs on to an application client through a first terminal, and the second physical force applied by a second account that logs on to an application client through a second terminal are obtained.

For example, taking the above obtaining the first physical force applied by the first account that logs on to the application client through the first terminal, and the second physical force applied by the second account that logs on to the application client through the second terminal as an example, the first terminal and the second terminal run the game program synchronously. The game program includes a virtual object. The first terminal obtains the first physical force to control the first virtual feature of the virtual object to perform the first action, and the second terminal obtains the second physical force to control the second virtual feature of the virtual object to perform the second action.

Optionally, the first virtual feature and the second virtual feature may be, but are not limited to, different feet, different tires or different wings of the virtual object. The first action and the second action may be, but are not limited to, moving actions.

For example, taking the first virtual feature and the second virtual feature being different feet, and the first action and the second action being moving actions as an example, description will be made with reference to a process of running a game application on a terminal. The game application running on the terminal includes a virtual object. The virtual object includes a plurality of feet. The terminal controls, according to the obtained first physical force, one foot of the virtual object to move, and controls, according to the obtained second physical force, another foot of the virtual object to move.

Optionally, the obtaining a first physical force matching the first virtual feature and a second physical force matching the second virtual feature may be, but are not limited to, obtaining, by the application client, the first physical force and the second physical force applied to the terminal on which the application client runs, or obtaining, by the application client, the first physical force and the second physical force applied to a hardware device connected to the terminal on which the application client runs.

Optionally, after obtaining the first physical force and the second physical force, a force function matching the virtual scene where the virtual object is located may be determined; a first control force matching the first physical force is determined according to the first physical force and the force function, and the first control force is used to control the first virtual feature to perform a first action; a second control force matching the second physical force is determined according to the second physical force and the force function, and the second control force is used to control the second virtual feature to perform a second action. However, this application is not limited thereto.

Optionally, the above first control force may control, but is not limited to, amplitude of the first virtual feature performing the first action, and the above second control force may control, but is not limited to, amplitude of the second virtual feature performing the second action.

The following illustration takes the virtual object being a virtual object on a game console, and the first physical force and the second physical force controlling movement of a left foot and a right foot of the virtual object as an example. The game console obtains the first physical force and the second physical force through an external game pad. After obtaining the first physical force and the second physical force, a first control force is determined according to the first physical force and the force function, and a second control force is determined according to the second physical force and the force function. The first control force is used to control the left foot of the virtual object to move, and the second control force is used to control the right foot of the virtual object to move, thereby controlling the left foot and the right foot of the virtual object to move, and flexibly controlling the virtual object.

In this embodiment, by obtaining the first virtual feature and the second virtual feature of the virtual object controlled by an application client, the first physical force may be used for controlling the first virtual feature, and the second physical force may be used for controlling the second virtual feature, thereby flexibly controlling a direction of the virtual object with left and right hands, and improving control efficiency of the virtual object.

In an optional implementation, the execution unit includes:

a first determining module, configured to determine a force function matching the virtual scene where the virtual object is located;

a second determining module, configured to determine, according to the first physical force and the force function, a first control force matching the first physical force, and use the first control force to control the first virtual feature to perform the first action; and a third determining module, configured to determine, according to the second physical force and the force function, a second control force matching the second physical force, and use the second control force to control the second virtual feature to perform the second action.

Optionally, after obtaining the first physical force, the first physical force is inputted as an independent variable into the force function, and the force function outputs the first control force; and the second physical force is inputted into the force function, and the force function outputs the second control force. However, this application is not limited thereto.

The above force function may be changed according to a change of the virtual scene.

In this embodiment, the force function matching the virtual scene of the virtual object is determined, the first control force is determined according to the first physical force and the force function, and the second control force is determined according to the second physical force and the force function. Therefore, different force functions may be selected for virtual scenes of different virtual objects, and then the first control force and the second control force matching the virtual scene are determined, thereby improving accuracy of the first control force and the second control force and flexibility and efficiency of controlling the virtual object.

In an optional implementation, the second determining module includes: a first obtaining sub-module, configured to obtain, according to the force function, a first force coefficient matching the first physical force, and a first maximum control force used in a case that the first action is performed in the virtual scene; and determine the first control force according to the first force coefficient, the first maximum control force and a first force vector matching the first physical force; and the third determining module includes: a second obtaining sub-module, configured to obtain, according to the force function, a second force coefficient matching the second physical force, and a second maximum control force used in a case that the second action is performed in the virtual scene; and determine the second control force according to the second force coefficient, the second maximum control force and a second force vector matching the second physical force.

Optionally, the first maximum control force may be, but is not limited to, a maximum control force acceptable to a first feature object, and the second maximum control force may be, but is not limited to, a maximum control force acceptable to a second feature object. When the obtained first physical force exceeds the first maximum control force, a value of the first maximum control force is assigned to the first physical force. When the obtained second physical force exceeds the second maximum control force, a value of the second maximum control force is assigned to the second physical force.

Optionally, the first control force may be obtained by the following formula:

the first control force=the first force coefficient*the first maximum control force*the first force vector and the second control force may be obtained by the following formula:

the second control force=the second force coefficient*the second maximum control force*the second force vector In this embodiment, by obtaining the first control force and the second control force according to the above formulas, accuracy of the first control force and the second control force is improved, thereby improving control efficiency of the virtual object.

In an optional implementation, the first obtaining sub-module is further configured to perform the following operations: obtaining a first force coefficient according to a first action duration for which a first control component sustains a first physical force and a force function; and the second obtaining sub-module is further configured to perform the following operations: obtaining a second force coefficient according to a second action duration for which a second control component sustains a second physical force and a force function.

Optionally, the first force coefficient may be, but is not limited to, a positive or negative number or may be changed in real time. That is to say, the force function may be, but is not limited to, an increasing function or a decreasing function, or a function that increases in a certain interval and decreases in another interval.

In this embodiment, the first force coefficient is obtained according to the first action duration of the first physical force on the first control component, and the second force coefficient is obtained according to the second action duration of the second physical force on the second control component, so as to obtain the first control force and the second control force according to the first force coefficient and the second force coefficient, thereby improving flexibility of the first control force and the second control force, and control efficiency of the virtual object.

In an optional implementation, the second obtaining unit is further configured to obtain a first physical force sustained by a first control component for controlling a first virtual feature and a second physical force sustained by a second control component for controlling a second virtual feature.

The first control component includes a first virtual joystick provided on a display interface of a terminal, or a first operating joystick provided in a peripheral input device.

The second control component includes a second virtual joystick provided on the display interface of the terminal, or a second operating joystick provided in the peripheral input device.

In this embodiment, the first physical force and the second physical force are obtained by providing the first virtual joystick and the second virtual joystick on the interface of the terminal where the application client is located, or the first physical force and the second physical force are obtained according to the peripheral input device, so as to improve efficiency of obtaining the first physical force and the second physical force, thereby improving control efficiency of controlling the virtual object.

In an optional implementation, the second determining module further includes a first scaling sub-module, configured to scale, according to a first scale, a force magnitude of a first physical force to obtain a vector size of a first force vector; and determine a vector direction of the first force vector according to a force direction of the first physical force; and the third determining module further includes a second scaling sub-module, configured to scale, according to a second scale, a force magnitude of the second physical force to obtain a vector size of the second force vector; and determine a vector direction of the second force vector according to a force direction of the second physical force.

Optionally, taking a terminal receiving the first physical force and the second physical force to control a left foot and a right foot of the virtual object to move as an example, the terminal may obtain, when obtaining the first physical force and the second physical force, not only sizes of the first physical force and the second physical force, but also directions of the first physical force and the second physical force. Directions of the first force vector and the second force vector are determined according to the directions of the first physical force and the second physical force, so as to obtain directions of the first control force and the second control force.

In this embodiment, the first force vector and the second force vector are obtained according to the above method, so as to determine the directions of the first control force and the second control force, thereby improving control efficiency of controlling the virtual object.

In an optional implementation, the first scaling sub-module is further configured to perform the following operations: determining a viewing angle direction in a virtual scene; and using a coordinate transformation matrix matching the viewing angle direction and a first direction vector corresponding to a force direction of a first physical force to perform coordinate transformation to obtain a first target direction vector used for indicating a vector direction of the first force vector; and the second scaling sub-module is further configured to perform the following operations: determining a viewing angle direction in a virtual scene; and using a coordinate transformation matrix matching the viewing angle direction and a second direction vector corresponding to a force direction of a second physical force to perform coordinate transformation to obtain a second target direction vector used for indicating a vector direction of the second force vector.

In this embodiment, the first target direction vector and the second target direction vector are obtained and the first control force and the second control force are determined according to the first target direction vector and the second target direction vector, thereby controlling the virtual object and improving control efficiency of controlling the virtual object.

In an optional implementation, if a first virtual feature includes a first foot and a second virtual feature includes a second foot, a first control module is configured to control the first foot of the virtual object to perform the first action; and a second control module is configured to control the second foot of the virtual object to perform the second action.

In this embodiment, the first foot of the virtual object is controlled to perform the first action and the second foot of the virtual object is controlled to perform the second action, thereby improving control efficiency of controlling the virtual object.

In an optional implementation, the second obtaining unit further includes:

a third obtaining module, configured to obtain a first state identifier matching a first virtual feature and a second state identifier matching a second virtual feature;

a fourth obtaining module, configured to obtain, in a case that the first state identifier indicates that the first virtual feature is in an undamaged state, a first physical force, where it is determined, in a case that the first virtual feature is located in a security zone set in a virtual scene, that the first virtual feature is in the undamaged state; and a fifth obtaining module, configured to obtain, in a case that the second state identifier indicates that the second virtual feature is in a state of being not completely damaged, a second physical force, where it is determined, in a case that the second virtual feature is located in a security zone set in a virtual scene, that the second virtual feature is in the undamaged state.

In this embodiment, by obtaining the first state identifier and the second state identifier, the states of the first virtual feature and the second virtual feature may be accurately identified, thereby improving control efficiency of controlling the virtual object.

In an optional implementation, the second obtaining unit further includes:

a sixth obtaining module, configured to obtain the first physical force and the second physical force applied by a first account that logs on to an application client through a first terminal; or a seventh obtaining module, configured to obtain the first physical force applied by the first account that logs on to the application client through the first terminal, and obtain the second physical force applied by a second account that logs on to the application client through a second terminal.

In this embodiment, the first physical force and the second physical force are obtained through the first terminal; or the first terminal obtains the first physical force and the second terminal obtains the second physical force, thereby improving flexibility of obtaining the first physical force and the second physical force, and improving flexibility of controlling the virtual object on the basis of ensuring efficiency of controlling the virtual object.

Figure 10:
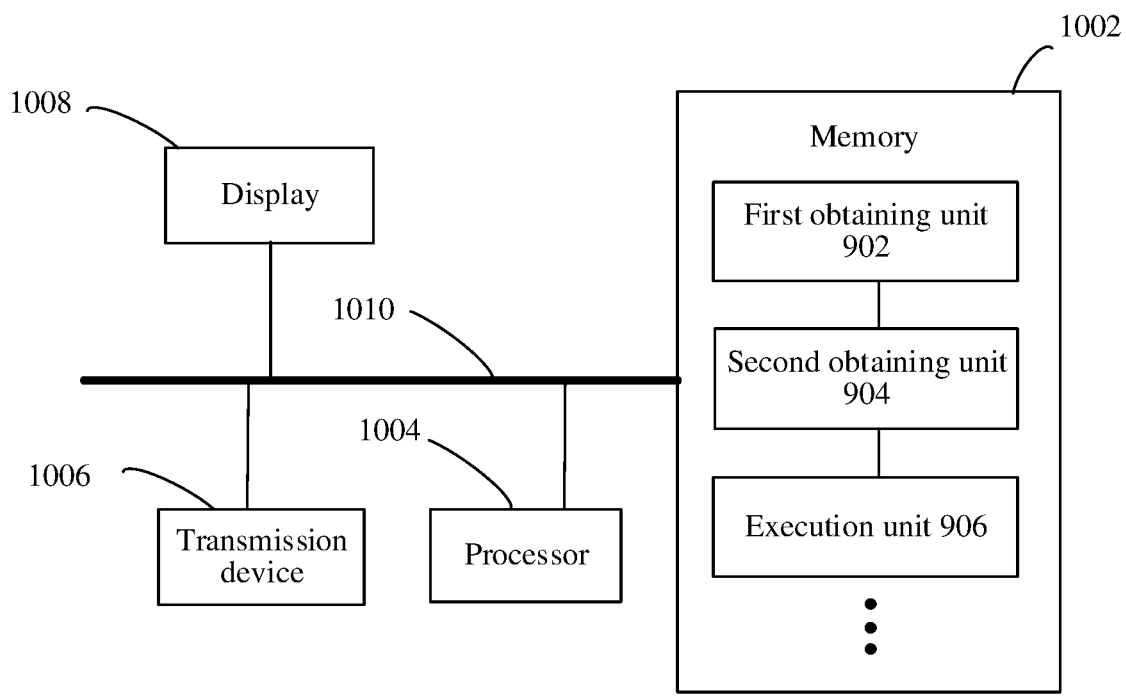
FIG. 10 is a schematic structural diagram of an optional electronic device according to an embodiment of this application.

According to yet another aspect of the embodiments of this application, an electronic device for implementing the above object control method is further provided. As shown in FIG. 10, the electronic device includes a memory 1002 and a processor 1004. The memory 1002 stores a computer program, and the processor 1004 is configured to perform the operations in any one of the above method embodiments through the computer program.

Optionally, in this embodiment, the processor may be configured to perform the following operations through the computer program:

S1. Obtain a first virtual feature and a second virtual feature included at least by a virtual object in a virtual scene.

S2. Obtain a first physical force matching the first virtual feature and a second physical force matching the second virtual feature.

S3. Control, according to the first physical force, the first virtual feature to perform a first action, and control, according to the second physical force, the second virtual feature to perform a second action.

Optionally, a person of ordinary skill in the art may understand that, the structure shown in FIG. 10 is only illustrative. The electronic device may be a terminal device such as a smartphone (for example, an Android mobile phone or an iOS mobile phone), a tablet computer, a palmtop computer, a mobile Internet device (MID), or a PAD. FIG. 10 does not limit the structure of the electronic device. For example, the electronic device may alternatively include more or fewer components (such as a network interface) than shown in FIG. 10, or have a configuration different from that shown in FIG. 10.

The memory 1002 may be configured to store a software program and a module, for example, a program instruction/module corresponding to the object control method and device in the embodiments of this application, and the processor 1004 performs various functional applications and data processing by running a software program and a module stored in the memory 1002, that is, implementing the foregoing object control method. The memory 1002 may include a high-speed random access memory, and may further include a non-volatile memory, for example, one or more magnetic storage devices, flash memories, or other non-volatile solid state memories. In some examples, the memory 1002 may further include memories remotely disposed relative to the processor 1004, and the remote memories may be connected to the terminal through a network. Examples of the network include, but are not limited to, the Internet, an intranet, a local area network, a mobile communication network, and a combination thereof. The memory 1002 may be specifically, but is not limited to, configured to store information such as the first physical force, the second physical force, and the force function. In an example, as shown in FIG. 10, the memory 1002 may include, but is not limited to, a first obtaining unit 902, a second obtaining unit 904, and an execution unit 906 in the object control device. In addition, the memory 1002 may include, but is not limited to, other module units in the object control device, which will not be elaborated in this example.

Optionally, the transmission device 1006 is configured to receive or transmit data via a network. The specific examples of the network may include a wired network and a wireless network. In one example, the transmission device 1006 includes a network interface controller (NIC), which may be connected to other network devices and routers via a network cable to communicate with the Internet or a local area network. In one example, the transmission device 1006 is a Radio Frequency (RF) module, which is configured to communicate with the Internet in a wireless manner.

In addition, the electronic device further includes: a display 1008, configured to display virtual objects; and a connection bus 1010, configured to connect various module components in the electronic device.

According to still yet another aspect of the embodiments of this application, a storage medium is further provided. The storage medium stores a computer program and the computer program is configured to perform, when running, the operations in any one of the above method embodiments.

Optionally, in this embodiment, the storage medium may be configured to store the computer program for executing the following operations:

S1. Obtain a first virtual feature and a second virtual feature included at least by a virtual object in a virtual scene.

S2. Obtain a first physical force matching the first virtual feature and a second physical force matching the second virtual feature.

S3. Control, according to the first physical force, the first virtual feature to perform a first action, and control, according to the second physical force, the second virtual feature to perform a second action.

Optionally, in this embodiment, the storage medium may be configured to store the computer program for executing the following operations:

S1. Determine a force function matching the virtual scene where the virtual object is located.

S2. Determine, according to the first physical force and the force function, a first control force matching the first physical force, and use the first control force to control the first virtual feature to perform the first action.

S3. Determine, according to the second physical force and the force function, a second control force matching the second physical force, and use the second control force to control the second virtual feature to perform the second action.

Optionally, in this embodiment, the storage medium may be configured to store the computer program for executing the following operations:

S1. The determining, according to the first physical force and the force function, a first control force matching the first physical force includes: obtaining, according to the force function, a first force coefficient matching the first physical force, and a first maximum control force used in a case that a first action is performed in a virtual scene; and determining the first control force according to the first force coefficient, the first maximum control force and a first force vector matching the first physical force.

S2. The determining, according to the second physical force and the force function, a second control force matching the second physical force includes: obtaining, according to the force function, a second force coefficient matching the second physical force, and a second maximum control force used in a case that a second action is performed in a virtual scene; and determining the second control force according to the second force coefficient, the second maximum control force and a second force vector matching the second physical force.

Optionally, in this embodiment, the storage medium may be configured to store the computer program for executing the following operations:

S1. The obtaining, according to a force function, a first force coefficient matching a first physical force includes: obtaining the first force coefficient according to a first action duration for which a first control component sustains the first physical force and the force function.

S2. The obtaining, according to a force function, a second force coefficient matching a second physical force includes: obtaining the second force coefficient according to a second action duration for which a second control component sustains the second physical force and the force function.

Optionally, in this embodiment, the storage medium may be configured to store the computer program for executing the following operations:

obtaining the first physical force sustained by the first control component for controlling the first virtual feature, and the second physical force sustained by the second control component for controlling the second virtual feature; the first control component including a first virtual joystick provided on a display interface of a terminal, or a first operating joystick provided in a peripheral input device; and the second control component including a second virtual joystick provided on the display interface of the terminal, or a second operating joystick provided in the peripheral input device.

Optionally, in this embodiment, the storage medium may be configured to store the computer program for executing the following operations:

before the determining the first control force according to the first force coefficient, the first maximum control force and a first force vector matching the first physical force, further including:

scaling, according to a first scale, a force magnitude of a first physical force to obtain a vector size of the first force vector; and determining a vector direction of the first force vector according to a force direction of a first physical force; the vector direction of the first force vector being used for determining a direction of the first control force; and before the determining the second control force according to the second force coefficient, the second maximum control force and a second force vector matching the second physical force, further including:

scaling, according to a second scale, a force magnitude of a second physical force to obtain a vector size of the second force vector; and determining a vector direction of the second force vector according to a force direction of a second physical force; the vector direction of the second force vector being used for determining a direction of the second control force.

Optionally, in this embodiment, the storage medium may be configured to store the computer program for executing the following operations:

S1. The determining a vector direction of a first force vector according to a force direction of a first physical force includes: determining a viewing angle direction in a virtual scene; and using a coordinate transformation matrix matching the viewing angle direction and a first direction vector corresponding to the force direction of the first physical force to perform coordinate transformation to obtain a first target direction vector used for indicating the vector direction of the first force vector; and S2. The determining a vector direction of a second force vector according to a force direction of a second physical force includes: determining a viewing angle direction in a virtual scene; and using a coordinate transformation matrix matching the viewing angle direction and a second direction vector corresponding to the force direction of the second physical force to perform coordinate transformation to obtain a second target direction vector used for indicating the vector direction of the second force vector.

Optionally, in this embodiment, the storage medium may be configured to store the computer program for executing the following operations:

if a first virtual feature includes a first foot and a second virtual feature includes a second foot, controlling the first foot of the virtual object to perform the first action; and controlling the second foot of the virtual object to perform the second action.

Optionally, in this embodiment, the storage medium may be configured to store the computer program for executing the following operations:

S1. Obtain a first state identifier matching the first virtual feature and a second state identifier matching the second virtual feature.

S2. Obtain, in a case that the first state identifier indicates that the first virtual feature is in an undamaged state, the first physical force, where it is determined, in a case that the first virtual feature is located in a security zone set in a virtual scene, that the first virtual feature is in the undamaged state.

S3. Obtain, in a case that the second state identifier indicates that the second virtual feature is in a state of being not completely damaged, the second physical force, where it is determined, in a case that the second virtual feature is located in a security zone set in a virtual scene, that the second virtual feature is in the undamaged state.

Optionally, in this embodiment, the storage medium may be configured to store the computer program for executing the following operations:

(1) obtaining the first physical force and the second physical force applied by a first account that logs on to an application client through a first terminal; or (2) obtaining the first physical force applied by the first account that logs on to the application client through the first terminal, and obtaining the second physical force applied by a second account that logs on to the application client through a second terminal.

An embodiment of this application further provides a computer program product including an instruction, when run on a server, the computer program product causing the server to perform the method according to the foregoing embodiments.

Optionally, in this embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash memory, a read-only memory (ROM), a random access memory (RAM), a magnetic disk, an optical disc, or the like.

The sequence numbers of the foregoing embodiments of this application are merely for description purpose, and do not indicate the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of this application essentially, or the part contributing to the existing technology, or all or some of the technical solutions may be implemented in the form of a software product. The computer software product is stored in a storage medium and includes several instructions for instructing one or more computer devices (which may be a personal computer, a server, a network device, and the like) to perform all or some of the operations of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is understood that the disclosed client may be implemented in other manners. The described device embodiments are merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary implementations of this application. A person of ordinary skill in the art may make several improvements or refinements without departing from the principle of this application and the improvements or refinements shall fall within the protection scope of this application.

What is claimed is:

1. A method for controlling a virtual object, the method comprising:
obtaining, by a device comprising a memory storing instructions and a processor in communication with the memory, a first virtual feature and a second virtual feature, a virtual object in a virtual scene comprising the first virtual feature and the second virtual feature;
obtaining, by the device, a first physical force matching the first virtual feature and a second physical force matching the second virtual feature;
scaling, by the device according to a first scale, a force magnitude of the first physical force to obtain a vector size of a first force vector;

determining, by the device, a vector direction of the first force vector according to a force direction of the first physical force, the vector direction of the first force vector being used for determining a direction of a first control force, by:
  determining, by the device, a viewing angle direction in the virtual scene, and
  using, by the device, a first coordinate transformation matrix matching the viewing angle direction and a first direction vector corresponding to the force direction of the first physical force to perform coordinate transformation to obtain a first target direction vector used for indicating the vector direction of the first force vector;
scaling, by the device according to a second scale, a force magnitude of the second physical force to obtain a vector size of a second force vector;
determining, by the device, a vector direction of the second force vector according to a force direction of the second physical force, the vector direction of the second force vector being used for determining a direction of a second control force, by:
  determining, by the device, a viewing angle direction in the virtual scene, and
  using, by the device, a second coordinate transformation matrix matching the viewing angle direction and a second direction vector corresponding to the force direction of the second physical force to perform coordinate transformation to obtain a second target direction vector used for indicating the vector direction of the second force vector; and
controlling, by the device according to the first physical force, the first virtual feature to perform a first action, and controlling, according to the second physical force, the second virtual feature to perform a second action.

2. The method according to claim 1, wherein the controlling, according to the first physical force, the first virtual feature to perform the first action, and controlling, according to the second physical force, the second virtual feature to perform the second action, comprises:
  determining, by the device, a force function matching the virtual scene where the virtual object is located;
  determining, by the device according to the first physical force and the force function, the first control force matching the first physical force, and using the first control force to control the first virtual feature to perform the first action; and
  determining, by the device according to the second physical force and the force function, the second control force matching the second physical force, and using the second control force to control the second virtual feature to perform the second action.

3. The method according to claim 2, wherein:
the determining, according to the first physical force and the force function, the first control force matching the first physical force, comprises:
  obtaining, by the device according to the force function, a first force coefficient matching the first physical force, and a first maximum control force used in a case that the first action is performed in the virtual scene, and
  determining, by the device, the first control force according to the first force coefficient, the first maximum control force and the first force vector matching the first physical force;

the determining, according to the second physical force and the force function, the second control force matching the second physical force, comprises:
  obtaining, by the device according to the force function, a second force coefficient matching the second physical force, and a second maximum control force used in a case that the second action is performed in the virtual scene, and
  determining, by the device, the second control force according to the second force coefficient, the second maximum control force and the second force vector matching the second physical force.

4. The method according to claim 3, wherein:
the obtaining, according to the force function, the first force coefficient matching the first physical force, comprises:
  obtaining, by the device, the first force coefficient according to a first action duration for which a first control component sustains the first physical force and the force function; and
the obtaining, according to the force function, the second force coefficient matching the second physical force, comprises:
  obtaining, by the device, the second force coefficient according to a second action duration for which a second control component sustains the second physical force and the force function.

5. The method according to claim 1, wherein the obtaining the first physical force matching the first virtual feature and the second physical force matching the second virtual feature, comprises:
  obtaining, by the device, the first physical force sustained by a first control component for controlling the first virtual feature; and
  obtaining, by the device, the second physical force sustained by a second control component for controlling the second virtual feature, wherein:
    the first control component comprises a first virtual joystick provided on a display interface of a terminal, or a first operating joystick provided in a peripheral input device, and
    the second control component comprises a second virtual joystick provided on the display interface of the terminal, or a second operating joystick provided in the peripheral input device.

6. A device for controlling a virtual object, the device comprising:
  a memory storing instruction; and
  a processor in communication with the memory, wherein, when the processor executes the instructions, the processor is configured to cause the device to:
    obtain a first virtual feature and a second virtual feature, a virtual object in a virtual scene comprising the first virtual feature and the second virtual feature;
    obtain a first physical force matching the first virtual feature and a second physical force matching the second virtual feature;
    scale, according to a first scale, a force magnitude of the first physical force to obtain a vector size of a first force vector;
    determine a vector direction of the first force vector according to a force direction of the first physical force, the vector direction of the first force vector being used for determining a direction of a first control force, by:
      determining a viewing angle direction in the virtual scene, and using a first coordinate transformation matrix matching the viewing angle direction and a first direction vector corresponding to the force direction of the first physical force to perform coordinate transformation to obtain a first target direction vector used for indicating the vector direction of the first force vector;

scale, according to a second scale, a force magnitude of the second physical force to obtain a vector size of a second force vector;

determine a vector direction of the second force vector according to a force direction of the second physical force, the vector direction of the second force vector being used for determining a direction of a second control force, by:

determining a viewing angle direction in the virtual scene, and using a second coordinate transformation matrix matching the viewing angle direction and a second direction vector corresponding to the force direction of the second physical force to perform coordinate transformation to obtain a second target direction vector used for indicating the vector direction of the second force vector; and control, according to the first physical force, the first virtual feature to perform a first action, and control, according to the second physical force, the second virtual feature to perform a second action.

7. The device according to claim 6, wherein, when the processor is configured to cause the device to control, according to the first physical force, the first virtual feature to perform the first action, and control, according to the second physical force, the second virtual feature to perform the second action, the processor is configured to cause the device to:

determine a force function matching the virtual scene where the virtual object is located;

determine, according to the first physical force and the force function, the first control force matching the first physical force, and use the first control force to control the first virtual feature to perform the first action; and determine, according to the second physical force and the force function, the second control force matching the second physical force, and use the second control force to control the second virtual feature to perform the second action.

8. The device according to claim 7, wherein:

when the processor is configured to cause the device to determine, according to the first physical force and the force function, the first control force matching the first physical force, the processor is configured to cause the device to:

obtain, according to the force function, a first force coefficient matching the first physical force, and a first maximum control force used in a case that the first action is performed in the virtual scene, and determine the first control force according to the first force coefficient, the first maximum control force and the first force vector matching the first physical force;

when the processor is configured to cause the device to determine, according to the second physical force and the force function, the second control force matching the second physical force, the processor is configured to cause the device to:

obtain, according to the force function, a second force coefficient matching the second physical force, and a second maximum control force used in a case that the second action is performed in the virtual scene, and determine the second control force according to the second force coefficient, the second maximum control force and the second force vector matching the second physical force.

9. The device according to claim 8, wherein:

when the processor is configured to cause the device to obtain, according to the force function, the first force coefficient matching the first physical force, the processor is configured to cause the device to:

obtain the first force coefficient according to a first action duration for which a first control component sustains the first physical force and the force function; and when the processor is configured to cause the device to obtain, according to the force function, the second force coefficient matching the second physical force, the processor is configured to cause the device to:

obtain the second force coefficient according to a second action duration for which a second control component sustains the second physical force and the force function.

10. The device according to claim 6, wherein, when the processor is configured to cause the device to obtain the first physical force matching the first virtual feature and the second physical force matching the second virtual feature, the processor is configured to cause the device to:

obtain the first physical force sustained by a first control component for controlling the first virtual feature; and obtain the second physical force sustained by a second control component for controlling the second virtual feature, wherein:

the first control component comprises a first virtual joystick provided on a display interface of a terminal, or a first operating joystick provided in a peripheral input device, and the second control component comprises a second virtual joystick provided on the display interface of the terminal, or a second operating joystick provided in the peripheral input device.

11. A non-transitory computer readable storage medium storing computer readable instructions, wherein, the computer readable instructions, when executed by a processor, are configured to cause the processor to perform:

obtaining a first virtual feature and a second virtual feature, a virtual object in a virtual scene comprising the first virtual feature and the second virtual feature;

obtaining a first physical force matching the first virtual feature and a second physical force matching the second virtual feature;

scaling, according to a first scale, a force magnitude of the first physical force to obtain a vector size of a first force vector;

determining a vector direction of the first force vector according to a force direction of the first physical force, the vector direction of the first force vector being used for determining a direction of a first control force, by:

determining a viewing angle direction in the virtual scene, and using a first coordinate transformation matrix matching the viewing angle direction and a first direction vector corresponding to the force direction of the first physical force to perform coordinate transformation to obtain a first target direction vector used for indicating the vector direction of the first force vector;

scaling, according to a second scale, a force magnitude of the second physical force to obtain a vector size of a second force vector;

determining a vector direction of the second force vector according to a force direction of the second physical force, the vector direction of the second force vector being used for determining a direction of a second control force, by:

determining a viewing angle direction in the virtual scene, and using a second coordinate transformation matrix matching the viewing angle direction and a second direction vector corresponding to the force direction of the second physical force to perform coordinate transformation to obtain a second target direction vector used for indicating the vector direction of the second force vector; and controlling, according to the first physical force, the first virtual feature to perform a first action, and controlling, according to the second physical force, the second virtual feature to perform a second action.

12. The non-transitory computer readable storage medium according to claim 11, wherein, when the computer readable instructions are configured to cause the processor to perform controlling, according to the first physical force, the first virtual feature to perform the first action, and controlling, according to the second physical force, the second virtual feature to perform the second action, the computer readable instructions are configured to cause the processor to perform:

determining a force function matching the virtual scene where the virtual object is located;

determining, according to the first physical force and the force function, the first control force matching the first physical force, and using the first control force to control the first virtual feature to perform the first action; and determining, according to the second physical force and the force function, the second control force matching the second physical force, and using the second control force to control the second virtual feature to perform the second action.

13. The non-transitory computer readable storage medium according to claim 12, wherein:

when the computer readable instructions are configured to cause the processor to perform determining, according to the first physical force and the force function, the first control force matching the first physical force, the computer readable instructions are configured to cause the processor to perform:

obtaining, according to the force function, a first force coefficient matching the first physical force, and a first maximum control force used in a case that the first action is performed in the virtual scene, and determining the first control force according to the first force coefficient, the first maximum control force and the first force vector matching the first physical force;

when the computer readable instructions are configured to cause the processor to perform determining, according to the second physical force and the force function, the second control force matching the second physical force, the computer readable instructions are configured to cause the processor to perform:

obtaining, according to the force function, a second force coefficient matching the second physical force, and a second maximum control force used in a case that the second action is performed in the virtual scene, and determining the second control force according to the second force coefficient, the second maximum control force and the second force vector matching the second physical force.

14. The non-transitory computer readable storage medium according to claim 13, wherein:

when the computer readable instructions are configured to cause the processor to perform obtaining, according to the force function, the first force coefficient matching the first physical force, the computer readable instructions are configured to cause the processor to perform:

obtaining the first force coefficient according to a first action duration for which a first control component sustains the first physical force and the force function; and when the computer readable instructions are configured to cause the processor to perform obtaining, according to the force function, the second force coefficient matching the second physical force, the computer readable instructions are configured to cause the processor to perform:

obtaining the second force coefficient according to a second action duration for which a second control component sustains the second physical force and the force function.

* * * * *